(12) United States Patent
Wilsher

(10) Patent No.: US 7,982,918 B2
(45) Date of Patent: Jul. 19, 2011

(54) IMAGE ANNOTATION USING BARCODES

(75) Inventor: Michael John Wilsher, Letchworth (GB)

(73) Assignee: Xerox Corporation, Norwalk, CT (US)

( * ) Notice: Subject to any disclaimer, the term of this patent is extended or adjusted under 35 U.S.C. 154(b) by 812 days.

(21) Appl. No.: 11/933,514

(22) Filed: Nov. 1, 2007

(65) Prior Publication Data

US 2009/0116074 A1 May 7, 2009

(51) Int. Cl.
*H04N 1/40* (2006.01)
(52) U.S. Cl. ........ 358/3.28; 358/448; 358/468; 358/470
(58) Field of Classification Search ............... 358/1.9, 358/2.1, 3.28, 1.18, 403, 444, 448, 468, 470; 705/401, 408; 382/182–183
See application file for complete search history.

(56) References Cited

U.S. PATENT DOCUMENTS

| | | | |
|---|---|---|---|
| 5,388,158 A * | 2/1995 | Berson | 713/176 |
| 7,314,216 B2 * | 1/2008 | Meunier | 270/52.02 |
| 2003/0095810 A1 * | 5/2003 | Haines et al. | 399/84 |
| 2004/0088271 A1 * | 5/2004 | Cleckler et al. | 705/408 |
| 2008/0046431 A1 * | 2/2008 | McGough | 707/7 |

* cited by examiner

*Primary Examiner* — Thomas D Lee
*Assistant Examiner* — Stephen M Brinich
(74) *Attorney, Agent, or Firm* — Ronald E. Prass, Jr.; Prass LLP

(57) ABSTRACT

A method and apparatus that annotates an image with a barcode is disclosed. The method may include receiving one or more image parameters from a user, determining information concerning a device to be used for processing, determining a date on which image processing occurs, determining a number of copies of the image to be processed, generating a barcode that contains at least coded information concerning the device to be used for processing, the date on which the image is processed, the number of copies of the image to be processed, and at least one of the one or more image parameters received from the user, and sending the generated barcode to the device to be used for processing to enable the barcode to be placed near the image when processed.

20 Claims, 5 Drawing Sheets

IMAGE ANNOTATION USING BARCODES

BACKGROUND

Disclosed herein are a method and apparatus for image processing, and in particular, a method that annotates images using barcodes, as well as corresponding apparatus and computer-readable medium.

In the area of image processing, testing of image quality, etc. is performed by scanning documents on the scanner. It is desirable to annotate the image so that one may track the number of images, the device identity and date of processing, for example. While text annotation of images exists, the text is not practical for device readability.

SUMMARY

A method and apparatus that annotates an image with a barcode is disclosed. The method may include receiving one or more image parameters from a user, determining information concerning a device to be used for processing, determining a date on which image processing occurs, determining a number of copies of the image to be processed, generating a barcode that contains at least coded information concerning the device to be used for processing, the date on which the image is processed, the number of copies of the image to be processed, and at least one of the one or more image parameters received from the user, and sending the generated barcode to the device to be used for processing to enable the barcode to be placed near the image when processed.

DETAILED DESCRIPTION

Figure 1:
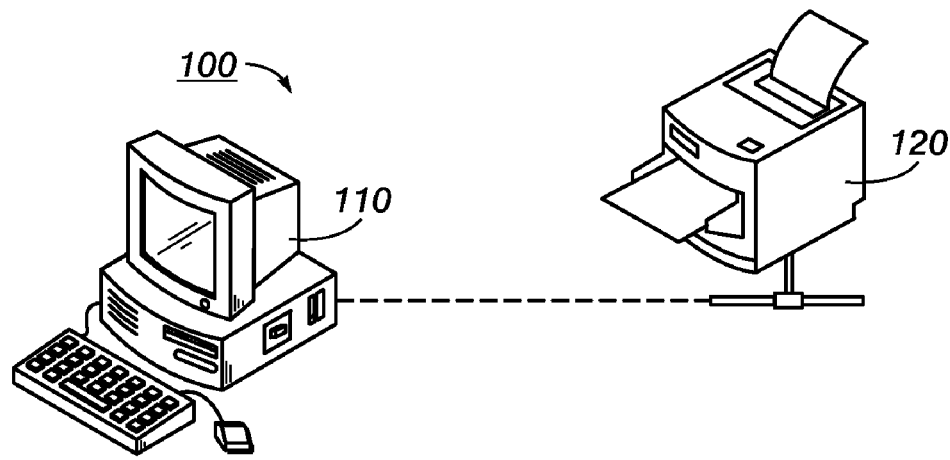
FIG. 1 illustrates an exemplary diagram of a computer system that includes image processing equipment in accordance with one possible embodiment of the disclosure.

Aspects of the embodiments disclosed herein relate to methods for annotating images with barcode, and corresponding apparatus and computer readable medium. The disclosed embodiments concern the addition of barcode annotation printing capability to image processing devices such as printers, copiers, scanners, and multi-function devices MFDs). Some conventional MFDs have text annotation capability but do not produce the annotation as a barcode.

Barcodes have desirable characteristics, such as device readability, robustness against extraneous marks, etc. that make them preferred in some applications to normal text. For copying, the annotation capability already present on the device may be used and a barcode font may be added along with a user interface mechanism to allow the user to select features, options, etc. For printing, the barcode annotation selection and specification may be added through an existing or new print driver. For copying, the barcode annotation selection and specification may be added through a user interface on the copier, for example. The barcode may be used for image tracking, copy tracking, image testing, copy testing, Bates numbering, classified document accountability, numbered artistic prints, numbered photos, etc., for example.

The disclosed embodiments may include a method that may include receiving one or more image parameters from a user, determining information concerning a device to be used for processing, determining a date on which image processing occurs, determining a number of copies of the image to be processed, generating a barcode that contains at least the coded information concerning the device to be used for processing, the date on which the image is processed, the number of copies of the image to be processed, and at least one of the one or more image parameters received from the user, and sending the generated barcode to the device to be used for processing to enable the barcode to be placed near the image when processed.

The disclosed embodiments further include an apparatus that may enable annotation of an image with a barcode, that may include a memory, and a barcode generator that receives one or more image parameters from a user, determines information concerning a device to be used for processing, determines a date on which image processing occurs, determines a number of copies of the image to be processed, generates a barcode that contains at least the coded information concerning the device to be used for processing, the date on which the image is processed, the number of copies of the image to be processed, and at least one of the one or more image parameters received from the user, and sends the generated barcode to the device to be used for processing to enable the barcode to be placed near the image when processed.

The disclosed embodiments further include a computer-readable medium that stores instructions for controlling a computing device for annotating an image with a barcode. The instructions may include receiving one or more image parameters from a user, determining information concerning a device to be used for processing, determining a date on which image processing occurs, determining a number of copies of the image to be processed; generating a barcode that contains at least the coded information concerning the device to be used for processing, the date on which the image is processed, the number of copies of the image to be processed, and at least one of the one or more image parameters received from the user, and sending the generated barcode to the device to be used for processing to enable the barcode to be placed near the image when processed.

FIG. 1 illustrates an exemplary diagram of a computer system 100 that includes image processing equipment in accordance with one possible embodiment of the disclosure. The computer system 100 may include a processing device 110 and an output device 120 (or image output device). The processing device 110 may be a personal computer, a portable computer, a personal digital assistant, and a server, for example. The output device 120 may be a printer, a copier, a scanner, a scanning device, a facsimile (fax) device, a multi-function device (MFD), or a memory or display of a personal computer, a portable computer, a personal digital assistant, and a server, for example.

Figure 2:
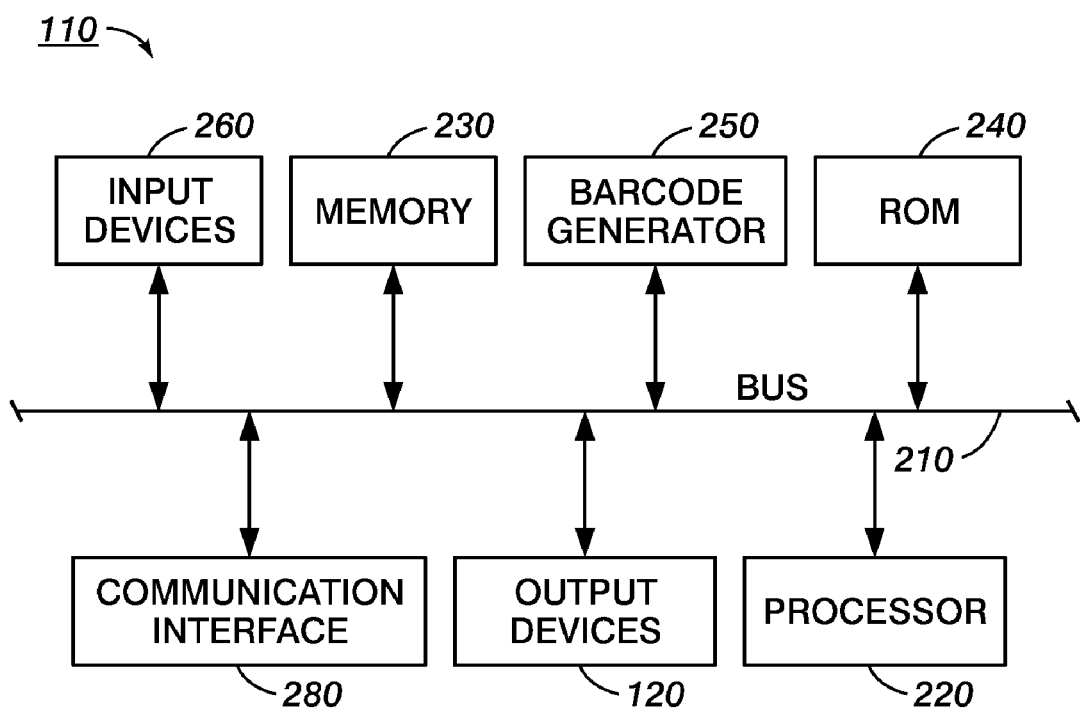
FIG. 2 illustrates a block diagram of an exemplary processing device in accordance with one possible embodiment of the disclosure.

FIG. 2 illustrates a block diagram of an exemplary processing device 110 in accordance with one possible embodiment of the disclosure. The processing device 110 may include may include a bus 210, a processor 220, a memory 230, a read only memory (ROM 240, a barcode generator 250, an input device 260, an output device 270, and a communication interface 280. Bus 210 may permit communication among the components of the processing device 110.

Processor 220 may include at least one conventional processor or microprocessor that interprets and executes instructions. Memory 230 may be a random access memory (RAM) or another type of dynamic storage device that stores information and instructions for execution by processor 220. Memory 230 may also include a read-only memory (ROM) which may include a conventional ROM device or another type of static storage device that stores static information and instructions for processor 220.

Communication interface 280 may include any mechanism that facilitates communication via a network. For example, communication interface 280 may include a modem. Alternatively, communication interface 280 may include other mechanisms for assisting in communications with other devices and/or systems.

ROM 240 may include a conventional ROM device or another type of static storage device that stores static information and instructions for processor 220. A storage device may augment the ROM and may include any type of storage media, such as, for example, magnetic or optical recording media and its corresponding drive.

Input device 260 may include one or more conventional mechanisms that permit a user to input information to the processing device 110, such as a keyboard, a mouse, a pen, a voice recognition device, touchpad, buttons, etc. Output device 120 may include one or more conventional mechanisms that output information to the user, including a display, a printer, a copier, a scanner, a multi-function device, one or more speakers, or a medium, such as a memory, or a magnetic or optical disk and a corresponding disk drive.

The processing device 110 may perform such functions in response to processor 220 by executing sequences of instructions contained in a computer-readable medium, such as, for example, memory 230. Such instructions may be read into memory 230 from another computer-readable medium, such as a storage device or from a separate device via communication interface 280.

The processing device 110 illustrated in FIGS. 1 and 2 and the related discussion are intended to provide a brief, general description of a suitable communication and processing environment in which the invention may be implemented. Although not required, the invention will be described, at least in part, in the general context of computer-executable instructions, such as program modules, being executed by the processing device 110, such as a communication server, communications switch, communications router, or general purpose computer, for example.

Generally, program modules include routine programs, objects, components, data structures, etc. that perform particular tasks or implement particular abstract data types. Moreover, those skilled in the art will appreciate that other embodiments of the invention may be practiced in communication network environments with many types of communication equipment and computer system configurations, including personal computers, hand-held devices, multi-processor systems, microprocessor-based or programmable consumer electronics, and the like.

Figure 3:
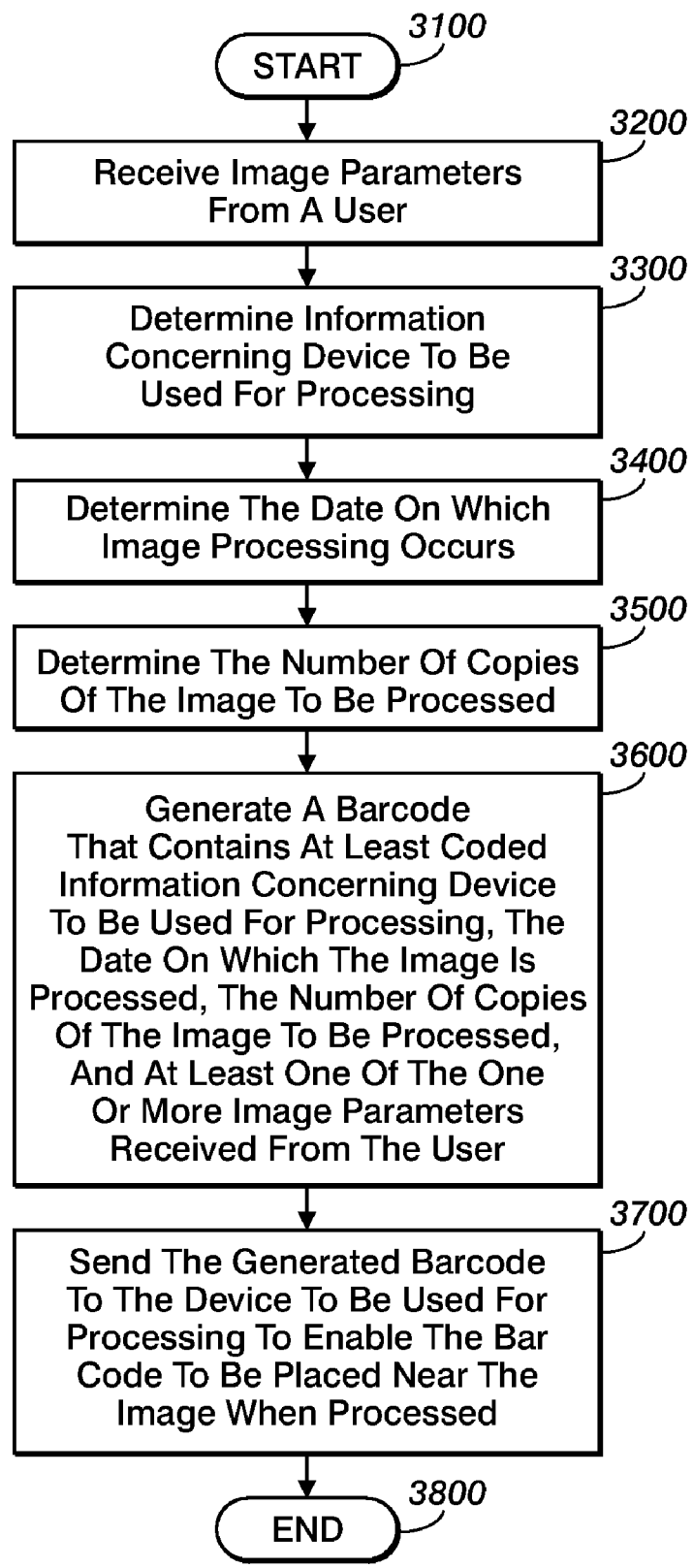
FIG. 3 is a flowchart of an exemplary barcode generation process in accordance with one possible embodiment of the disclosure.

For illustrative purposes, the operation of the processing device 110 and the bar code generation process are described in FIG. 3 in relation to the block diagrams shown in FIGS. 1 and 2.

Figure 4:
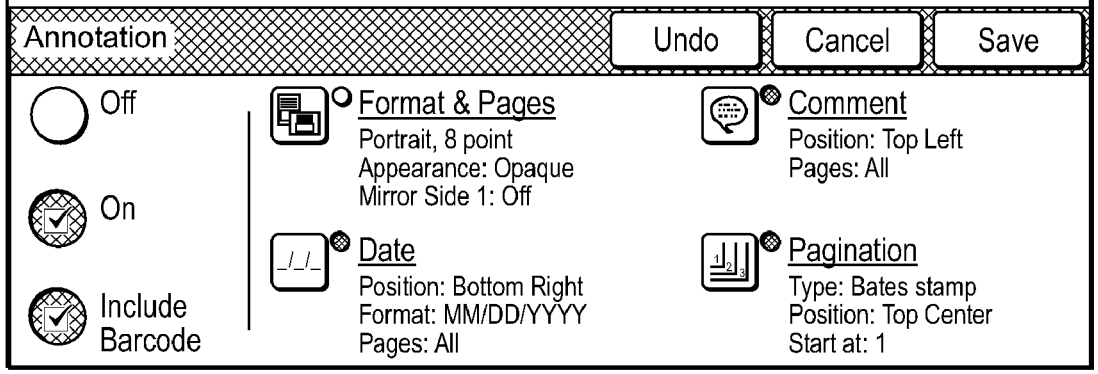
FIG. 4 illustrates an exemplary diagram of a user interface screen in accordance with one possible embodiment of the disclosure.

FIG. 3 is a flowchart of an exemplary barcode generation process in accordance with one possible embodiment of the disclosure. The method begins at 3100, and continues to 3200 where the barcode generator 250 may receive one or more image parameters from a user. FIG. 4 illustrates an exemplary diagram of a user interface screen 400 in accordance with one possible embodiment of the disclosure. The user interface screen 400 may include many options for the user to choose concerning the image and the barcode used to annotate the image. These options may include turning the barcode feature on or off, selecting the position of the barcode relative to the image, selecting whether comments are to appear, selecting whether the barcode is to appear on all pages or just on select pages, a selecting data to be coded in the barcode, such as the date, time, number of pages number of pages, images, image processing device identification information, format of the barcode and related annotations, scheduled date and time for printing, barcode size, page orientation, annotation font size, security classification, image description, image author, user identification number, meeting information, etc.

Figure 5:
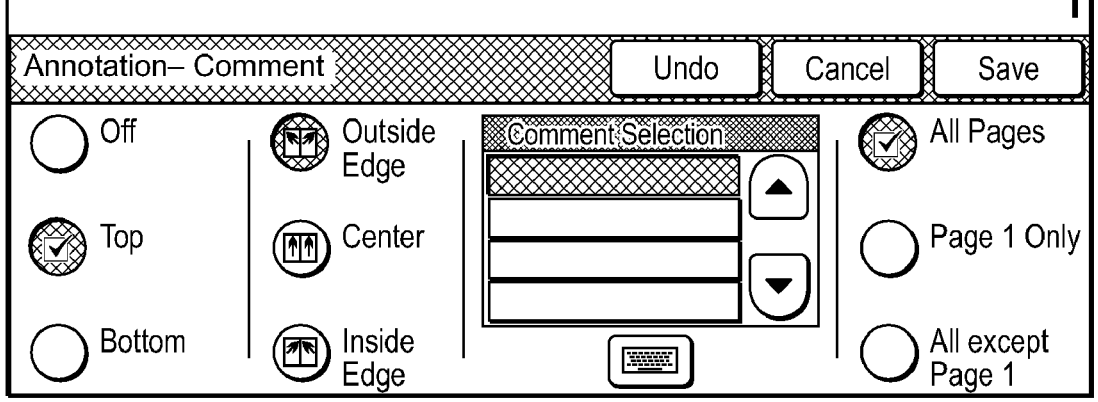
FIG. 5 illustrates an exemplary diagram of a user interface screen in accordance with one possible embodiment of the disclosure.

FIG. 5 illustrates an exemplary diagram of another user interface screen 500 in accordance with one possible embodiment of the disclosure. This user interface screen 500 may include many options to enable the user to annotate the image with comments along with the barcode. These options may include the position of the comments relative to the image, whether the comments are to appear on all pages or just on select pages, a selection of predetermined or standard comments, etc.

At step 3300, the barcode generator 250 may determine information concerning a device to be used for processing. The device to be used for processing may be the output device 120, for example, which may be a printer, a copier, a scanner, a scanning device, a facsimile (fax) device, a multi-function device (MFD), or a memory or display of a personal computer, a portable computer, a personal digital assistant, and a server, for example. The device information may be the device identification number, serial number, type, model, make, customized identifier (i.e., "Matthew's scanner," "Megan's printer," etc.), location, etc.

At step 3400, the barcode generator 250 may determine a date on which image processing occurs. The bar code generator 250 may also determine a time of day that the image is processed. At step 3500, the barcode generator 250 may determine a number of copies of the image to be processed. The number of copies may be determined by the numbers entered by the user using the user interface screen 400, or according to a an image counter which get incremented as each image prints or is entered for printing.

Figure 6:
FIG. 6. Is an exemplary barcode in accordance with one possible embodiment of the disclosure.

At step 3600, the barcode generator 250 may generate a barcode that contains at least the coded information concerning the device to be used for processing, the date on which the image is processed, the number of copies of the image to be processed, and at least one of the one or more image parameters received from the user. FIG. 6 illustrates an exemplary barcode annotation 600 in accordance with one possible embodiment of the disclosure. The exemplary barcode annotation 600 may include a barcode 610, and text information fields that identify at least a portion of the barcode's content, such as the imaging device identification 620, the date/time information 630, and the copy count information 640, for example.

Figure 7:
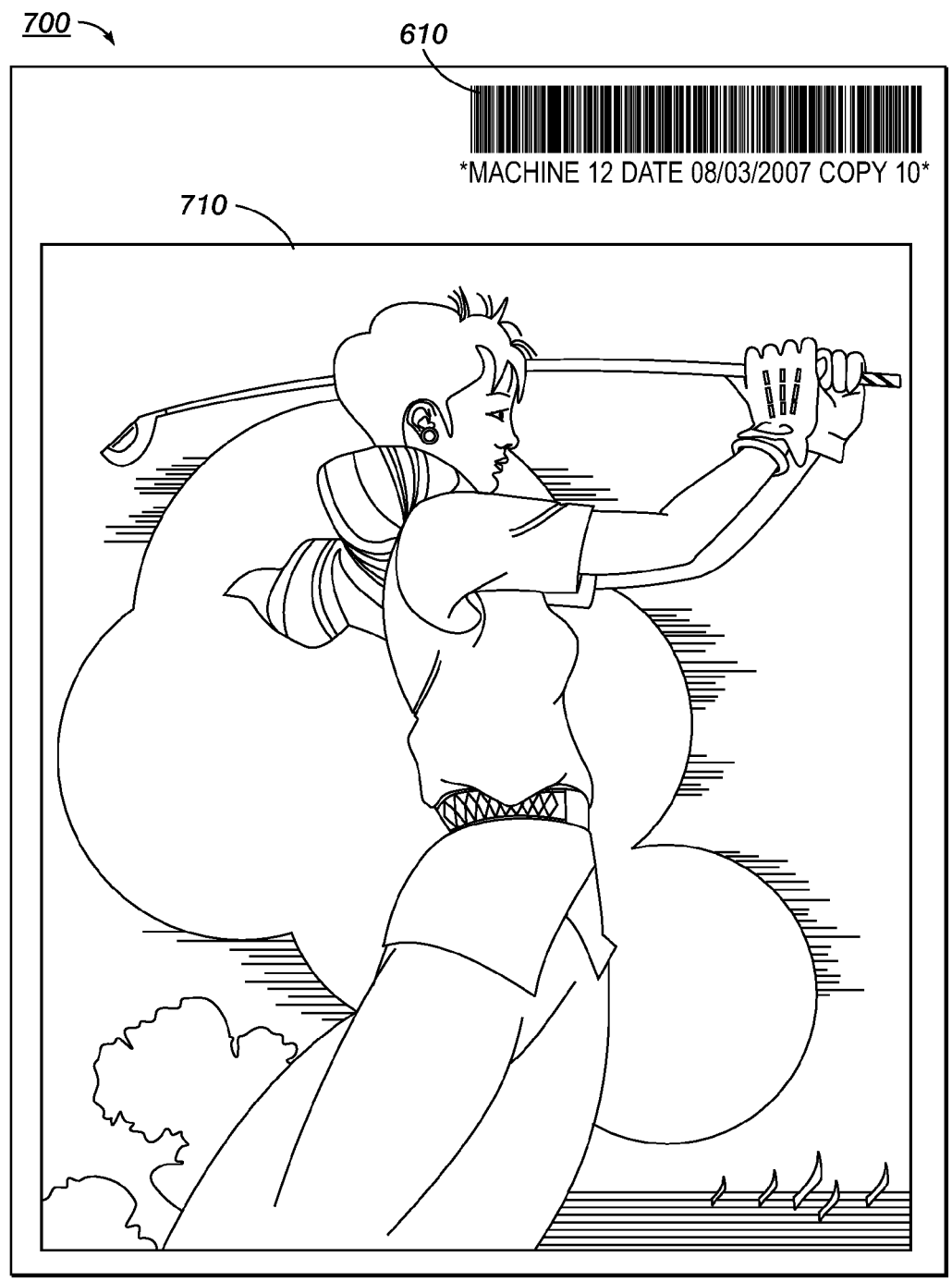
FIG. 7 is an exemplary barcode annotated image in accordance with one possible embodiment of the disclosure.

At step 3700, the barcode generator 250 may send the generated barcode to the device to be used for processing to enable the barcode to be placed near the image when processed. FIG. 7 illustrates an exemplary barcode annotated image 700 in accordance with one possible embodiment of the disclosure. The exemplary barcode annotated image 700 may include the image 710 and the barcode 610 located near the image in a position selected automatically or as selected by the user using the user interface screen 400, for example.

The exemplary barcode annotated image 700 may be processed on a printer, a copier, a scanner, a computer, a server, and a personal digital assistant, for example, and then displayed, scanned, printed, and and/or stored in memory., for example. The generated barcode may be read by any type of scanner that can read barcodes, such as a flat-bed scanner, hand-held scanner, etc. The process then goes to step 3800, and ends.

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hard-wired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of annotating an image with a barcode, comprising:
   receiving one or more image parameters from a user;
   determining identification information for a device to be used for processing;
   determining a date on which image processing occurs;
   determining a number of copies of the image to be processed;
   generating a barcode that contains at least coded information that includes identification information for the device to be used for processing, the date on which the image is processed, the number of copies of the image to be processed, and at least one of the one or more image parameters received from the user; and
   sending the generated barcode to the device to be used for processing to enable the generated barcode to be placed near the image when processed.

2. The method of claim 1, further comprising:
   determining a time of image processing on the determined date of processing, wherein the generated barcode includes coded information that includes the time of image processing.

3. The method of claim 1, wherein the image is processed by at least one of a printer, a copier, a scanner, a computer, a server, and a personal digital assistant.

4. The method of claim 1, further comprising:
   storing the image and generated barcode in digital form in a memory.

5. The method of claim 1, wherein the one or more image parameters from the user includes at least one of selecting the position of the barcode relative to the image, selecting whether comments are to appear, selecting whether the barcode is to appear on all pages or just on select pages, a selecting data to be coded in the barcode, such as the date, time, number of pages number of pages, images, image processing device identification information, format of the barcode and related annotations, scheduled date and time for printing, barcode size, page orientation, annotation font size, security classification, image description, image author, user identification number, and meeting information.

6. The method of claim 1, wherein the barcode is used for at least one of image tracking, copy tracking, image testing, copy testing, Bates numbering, classified document accountability, numbered artistic prints, and numbered photos.

7. The method of claim 1, wherein the method is performed using at least one of a device driver and a user interface.

8. An apparatus that enables annotation of an image with a barcode, comprising:
   a memory; and
   a barcode generator that receives one or more image parameters from a user, determines identification information for a device to be used for processing, determines a date on which image processing occurs, determines a number of copies of the image to be processed, generates a barcode that contains at least coded information that includes identification information for the device to be used for processing, the date on which the image is processed, the number of copies of the image to be processed, and at least one of the one or more image parameters received from the user, and sends the generated barcode to the device to be used for processing to enable the generated barcode to be placed near the image when processed.

9. The apparatus of claim 8, wherein the barcode generator determines a time of image processing on the determined date of processing, wherein the generated barcode includes coded information that includes the time of image processing.

10. The apparatus of claim 8, wherein the image is processed by at least one of a printer, a copier, a scanner, a computer, a server, and a personal digital assistant.

11. The apparatus of claim 8, wherein the barcode generator stores the image and generated barcode in digital form in the memory.

12. The apparatus of claim 8, wherein the one or more image parameters from the user includes at least one of selecting the position of the barcode relative to the image, selecting whether comments are to appear, selecting whether the barcode is to appear on all pages or just on select pages, a selecting data to be coded in the barcode, such as the date, time, number of pages number of pages, images, image processing device identification information, format of the barcode and related annotations, scheduled date and time for printing, barcode size, page orientation, annotation font size, security classification, image description, image author, user identification number, and meeting information.

13. The apparatus of claim 8, wherein the barcode is used for at least one of image tracking, copy tracking, image testing, copy testing, Bates numbering, classified document accountability, numbered artistic prints, and numbered photos.

14. The apparatus of claim 8, wherein one of a printer applies the barcode using a printer driver and a copier applies the barcode using a user interface.

15. A non-transitory computer-readable medium storing instructions for controlling a computing device for annotating an image with a barcode, the instructions comprising:
   receiving one or more image parameters from a user;
   determining identification information for a device to be used for processing;
   determining a date on which image processing occurs;
   determining a number of copies of the image to be processed;
   generating a barcode that contains at least coded information that includes identification information for the device to be used for processing, the date on which the image is processed, the number of copies of the image to be processed, and at least one of the one or more image parameters received from the user; and
   sending the generated barcode to the device to be used for processing to enable the generated barcode to be placed near the image when processed.

16. The non-transitory computer-readable medium of claim 15, wherein the instructions further comprise:
   determining a time of image processing on the determined date of processing, wherein the generated barcode includes coded information that includes the time of image processing.

17. The non-transitory computer-readable medium of claim 15, wherein the image is processed by at least one of a printer, a copier, a scanner, a computer, a server, and a personal digital assistant.

18. The non-transitory computer-readable medium of claim 15, wherein the instructions further comprise:
   storing the image and generated barcode in digital form in a memory.

19. The non-transitory computer-readable medium of claim 15, wherein the one or more image parameters from the user includes at least one of selecting the position of the barcode relative to the image, selecting whether comments are to appear, selecting whether the barcode is to appear on all pages or just on select pages, a selecting data to be coded in the barcode, such as the date, time, number of pages number of pages, images, image processing device identification information, format of the barcode and related annotations, scheduled date and time for printing, barcode size, page orientation, annotation font size, security classification, image description, image author, user identification number, and meeting information.

20. The non-transitory computer-readable medium of claim 15, wherein the barcode is used for at least one of image tracking, copy tracking, image testing, copy testing, Bates numbering, classified document accountability, numbered artistic prints, and numbered photos.

\* \* \* \* \*